United States Patent [19]

Zahid

[11] 4,317,472

[45] Mar. 2, 1982

[54] REPLACEABLE BLADDER ACCUMULATOR DEVICE

[75] Inventor: Abduz Zahid, Los Angeles, Calif.

[73] Assignee: Greer Hydraulics Incorporated, Chatsworth, Calif.

[21] Appl. No.: 178,144

[22] Filed: Aug. 14, 1980

[51] Int. Cl.[3] .............................................. F16L 55/04

[52] U.S. Cl. ..................................... 138/30; 220/85 B

[58] Field of Search.................... 220/85 B; 138/30, 26

[56] References Cited

U.S. PATENT DOCUMENTS 3,230,975 1/1966 Mercier ................................ 138/30

3,232,318 2/1966 Mercier ................................ 138/30

3,593,746 7/1971 Allewitz et al. ...................... 138/30

*Primary Examiner*—James E. Bryant, III

*Assistant Examiner*—Daniel P. Stodola

*Attorney, Agent, or Firm*—Arthur B. Colvin

[57] ABSTRACT

An accumulator device comprising a pressure vessel having a replaceable bladder assembly adapted to be inserted into position within the vessel through a bore defining the gas charging port. The device is characterized by the provision of a bladder assembly having a stem molded thereto and adapted to project through the bore at the gas charging end of the vessel. A locking ring having larger diameter than the bore is rendered insertible endwise into the interior of the vessel as a result of the provision of reduced side portions. A retainer plate is provided which is insertible over the stem from the exterior of the vessel, the retaining plate including aligned portions projecting downwardly into the bore and filling the space between the reduced side or clearance portions of the ring and the bore to prevent extrusion of the bladder through the bore.

9 Claims, 5 Drawing Figures

REPLACEABLE BLADDER ACCUMULATOR DEVICE

BACKGROUND OF THE INVENTION

1. Field of the Invention

The present invention is in the field of accumulator devices, and more particularly to accumulator devices of the type comprising a pressure vessel divided into two chambers by an expansible elastomeric bladder. One chamber of the pressure vessel is connected to an oil port communicated with a hydraulic line. The other chamber is charged with gas under pressure.

2. The Prior Art

The use of hydraulic accumulators both as pulsation dampeners and energy storage devices is progressively increasing. Typically, such assumulator devices comprises a pressure vessel having a bladder mounted therein. The bladder may be secured to and be supported on a retaining ring which is weldingly connected to one of the two shells of which the vessel is constructed. Thereafter, assembly of the device is completed by placing the second shell over the first shell and weldingly connecting the two noted components.

It will be readily recognized from the above description that there is no practical way of removing and replacing the bladder should the same become punctured or otherwise compromised. Typically it is therefore necessary to replace the entire accumulator device.

Representative examples of accumulator devices of the type described may be found in U.S. Pat. Nos. 3,690,347 issued Sept. 12, 1972 and 3,881,519 issued May 6, 1975. A repairable bladder accumulator is shown in U.S. Pat. No. 3,960,179. However, the device of such patent requires the provision of a forged and machined vessel and hence is costly.

SUMMARY OF THE INVENTION

The present invention may be summarized as directed to an accumulator device which is characterized in that the bladder assembly may be inserted through the gas charging port. In this manner, in the event of rupture of the bladder, either through fatigue, contact with corrosive liquids or puncture by entrained pulverulent material, etc. the accumulator need not be discarded, it being merely necessary to replace the bladder assembly.

More specifically, the repairable accumulator device of the present invention includes a shell having a gas charging port and a bladder assembly insertible therethrough. A novel bladder retaining assembly is provided including a locking ring having a first transverse dimension larger than the gas charging port and a second transverse dimension smaller than the gas charging port, whereby the ring may be inserted endwisely into the interior of the pressure vessel through the bore by tilting the ring, with the smaller dimension aligned with the axis of the vessel. In this manner the ring may be passed into the interior of the vessel, and a stem affixed to the bladder passed outwardly through an aperture formed in the ring.

In order to prevent extrusion of portions of the bladder through the spaces defined between the bore and the smaller dimension of the ring, the retaining assembly includes a retainer plate having depending lands mounted in the bore and juxtaposed to and filling the space between the ring and the bore.

Accordingly, it is an object of the invention to provide a top repairable accumulator device.

A further object of the invention is the provision of an accumulator device of the type described wherein the bladder and its associated retainer assembly may be passed into the interior of the pressure vessel into operative position through the gas charging port.

Still a further object of the invention is the provision of a device of the type described which includes a locking ring of rigid material adapted to be shifted through the gas charging port and interposed between the bladder and the pressure vessel, in combination with a locking plate which fills the clearances between the retaining or locking ring and the bore, thereby providing an essentially uninterrupted solid surface between the bladder and bore precluding extrusion of the bladder through the bore.

To attain these objects and such further objects as may appear herein or be hereinafter pointed out, reference is made to the accompanying drawings forming a part hereof in which:

FIG. 1 is a top plan view of an accumulator device of the type described;

FIG. 1*a* is a reduced size side elevational view of the accumulator device in accordance with FIG. 1;

Figure 1A:
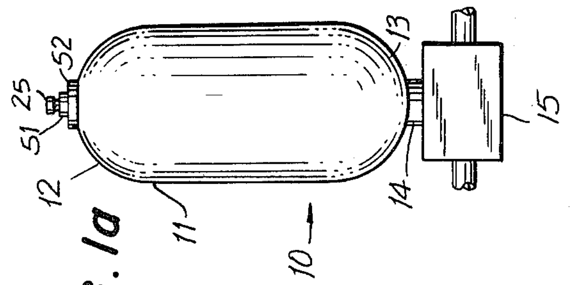

Turning now to the drawings, there is shown in FIG. 1*a* a view of an accumulator device 10 in accordance with the invention, the device including a rigid pressure vessel 11 having generally hemispherical upper and lower ends 12, 13, respectively, and a neck 14 having formed therein a conventional oil port. The neck 14 is connected to a housing 15 to which conduits may be attached, whereby the liquid components of a hydraulic system may enter the vessel through the oil port.

Since the oil port assembly, housing, and means of connecting the same to a hydraulic line, are altogether conventional and form no part of the present invention, further illustration of the details thereof has not been undertaken.

The present invention is concerned with means whereby the bladder assembly 16, which comprises the stem 17 and the bladder 18 may be releasably mounted in a bore or gas charging port 19 formed in the upper end 12 of the pressure vessel 11.

More particularly, the bladder 18, which is formed of an elastomeric material such as Neoprene, is provided with a metallic stem member 17. Preferably, the bladder is molded in situ over a radially projecting flange portion 20 formed at the lower end of the stem 17.

The stem may include a radially outwardly directed annular shoulder 21 and an adjacent upwardly facing shoulder 22, the uppermost annular area 23 of the bladder being preferably in coplanar alignment with the surface 22.

The stem 17 includes an axially directed gas charging passage 24 and may be capped as by threaded cap 25. Additionally, as is conventional, a one way gas charging valve (not shown) may be mounted in the upper end of the passage 24.

The bladder 18 includes an axial passage 26 which forms a continuation of the passage 24 of the stem 17 providing access to the interior of the bladder.

The transverse dimension of the flange 20 is related to the diameter of the bore 19 in such manner that the bladder, in its collapsed condition, may be readily folded and forced through the bore, as may the thickened uppermost portion of the bladder where it is appended to the flange.

Figure 2:
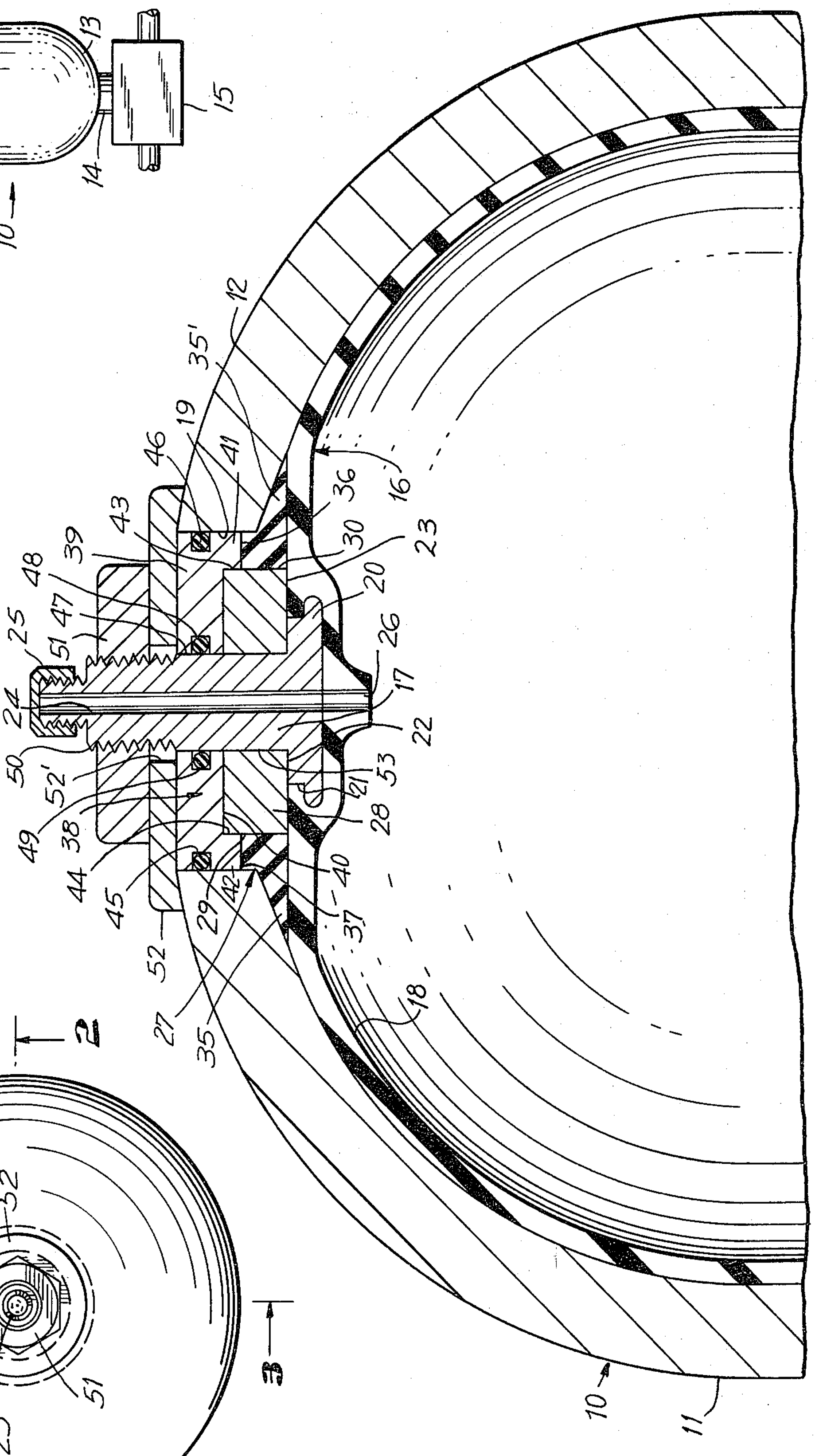
FIG. 2 is a magnified vertical sectional view taken on the line 2—2 of FIG. 1.
Figure 1:
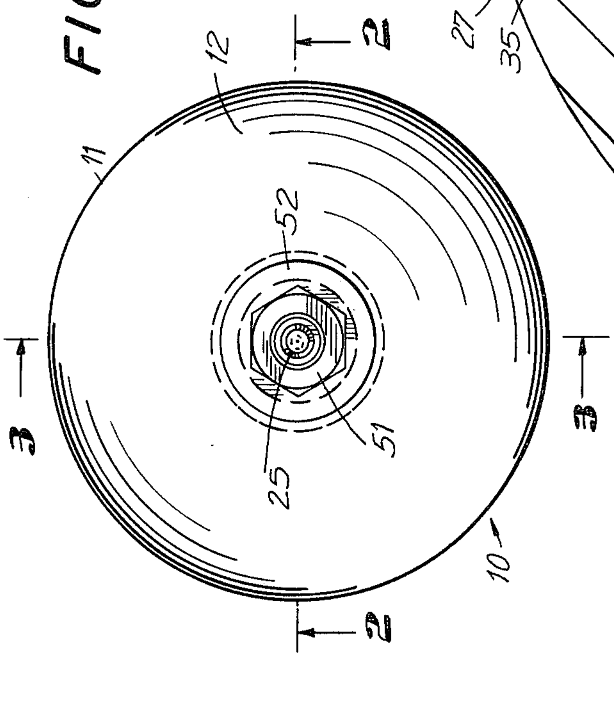
Figure 4:
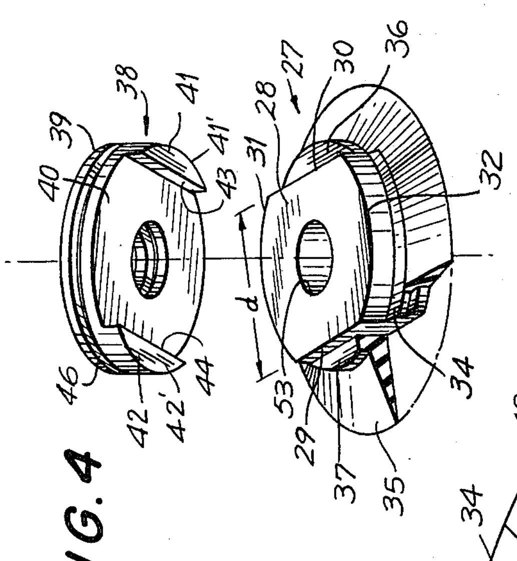
FIG. 4 is an exploded perspective view, partly in section, of components of the bladder retainer assembly.
Figure 3:
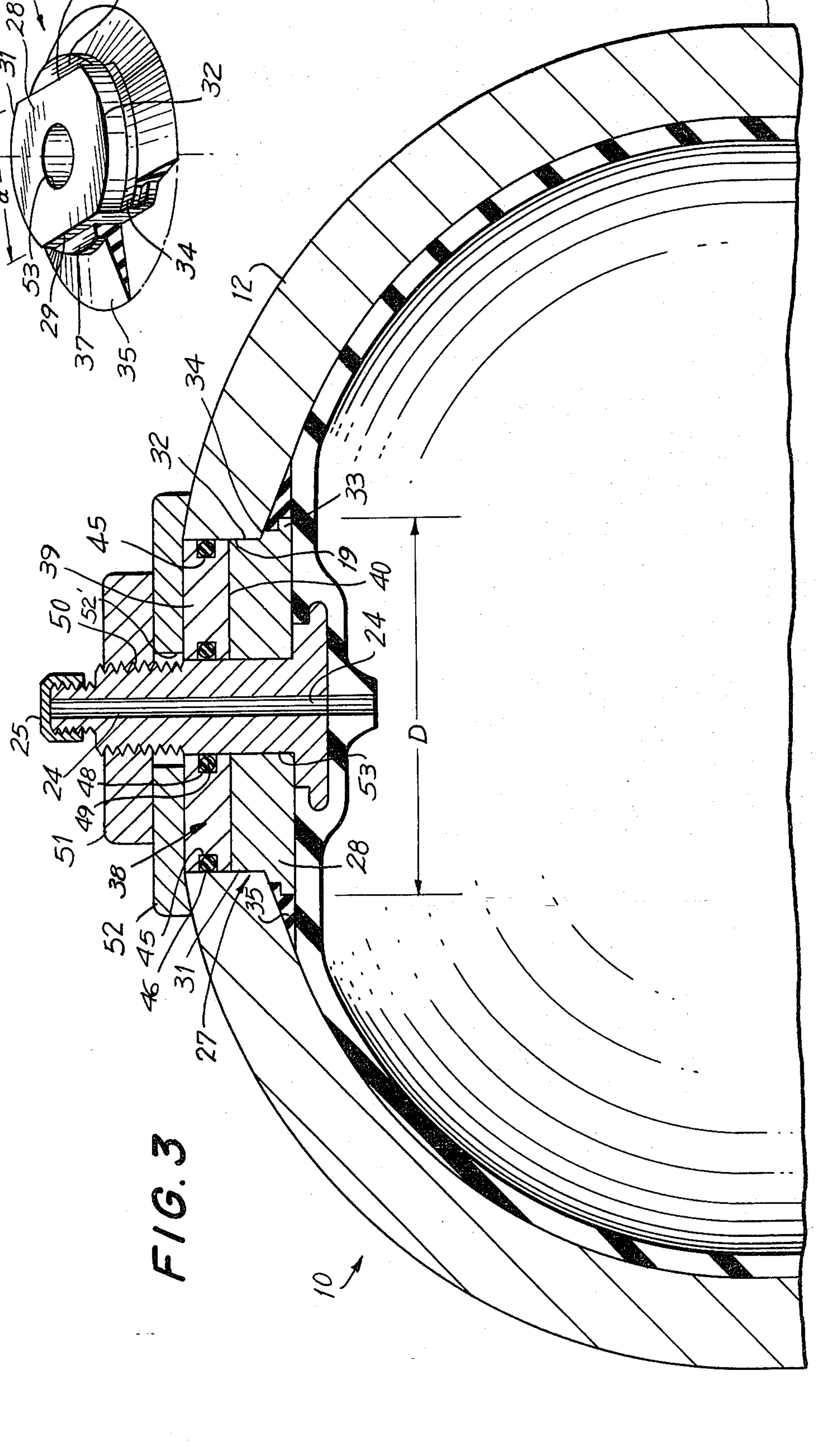
FIG. 3 is a view similar to FIG. 2 taken on the line 3—3 of FIG. 1 and offset by 90° from the section of FIG. 2.

In order to prevent the bladder assembly from being extruded outwardly through the bore 19, when the bladder is charged with gas under pressure, to retain the bladder assembly in position, there is provided a locking ring assembly 27, the structural details of which may best be appreciated by reference to FIGS. 2, 3 and 4.

The locking ring assembly comprises a rigid metallic member 28 which is generally disk-like in plan, but which has an opposed pair of reduced size side portions 29, 30 which, in the illustrated embodiment, are in the form of vertical parallel walls.

As will be apparent from an inspection of FIGS. 2 and 4, the spacing or distance between the walls 29, 30 is less than the diameter of the bore 19. However, as is evident from FIG. 3, the major diameter D of the locking ring 27 is greater than the diameter of the bore 19.

The rounded end portions 31, 32 of the locking ring 27 include a laterally projecting flange member 33, the ring in addition including an upwardly facing beveled portion 34, curved to conform with the curvature of the interior walls of the pressure vessel surrounding the bore. An annular elastomeric collar member 35 is molded over the flange 33 of the locking ring, the collar, in the area adjacent the walls 29, 30, including upwardly facing flat portions 36, 37.

As will be appreciated particularly from an inspection of FIGS. 2 and 4, the locking ring assembly 27 may be inserted into the interior of the pressure vessel by folding the resilient collar 35 inwardly, aligning the side walls 29, 30 with the axis of the pressure vessel and sleeving the locking ring into the interior of the vessel.

When the ring is moved to the position shown in FIG. 2, it will be evident that there are exposed elastomeric areas, e.g. the flat portions 37, 36 which, if permitted to be unreinforced, would, upon sufficient pressure being directed against the interior of the bladder, be extruded outwardly through the bore 19. In order to prevent such outward extrusion, there is provided a retaining plate 38, the configuration of which is best appreciated from FIGS. 2, 3 and 4.

The retaining plate 38 includes an upper disklike portion 39, and a flat central undersurface portion 40, from which extend a depending pair of lands 41, 42. The lands include inwardly facing planar walls 43,44, respectively which in the assembled condition lie intimately adjacent the walls 29, 30 respectively of the retaining plate 38. An outwardly opening annular groove 45 is formed about the periphery of the retaining plate 38, which groove encompasses a radially projecting O-ring 46 or like gasket. The plate 38 includes an axially directed aperture 47, within which is formed an inwardly facing annular groove 48 carrying an inwardly projecting O-ring 49. The stem 17 includes a threaded portion 50 forming an anchor point for a locking nut 51 and a radially projecting member or washer 52.

The manner of assembly of the device will be apparent from the preceding description.

When it is desired to insert (or to replace) the bladder, the bladder assembly 16 is first passed inwardly through the bore 19. Thereafter, in the manner previously noted, the locking ring assembly 27 is inserted into the interior of the pressure vessel through the bore 19 by tilting the same to align the plane of the ring with the axis of the pressure vessel while the walls 29, 30 are essentially aligned in the direction of the pressure vessel axis.

With the elastomeric collar 35 deflected or curled it is thus a simple manner to pass the ring into the interior of the vessel.

Thereafter, the stem 17 is passed upwardly and outwardly through aperture 53 formed in the ring 28 and drawn outwardly, the plane of the ring assembly 27 at such time being shifted to a position perpendicular to the axis of the pressure vessel and stem.

It will be observed, particularly from an inspection of FIG. 3, that movement of the stem and the ring 27 in an outwardly direction is limited by metal-to-metal contact between the beveled portion 34 of the ring assembly 27 and the inner wall portions of the pressure vessel surrounding the bore 19.

With the stem and ring assembly 27 positioned as noted, the retainer plate 38 is lowered over the stem in such manner that the lands 41, 42 are in alignment with the planar side wall portions 29, 30 of the locking ring.

In the noted assembled condition, the inner wall portions 43, 44 of the plate are in intimate juxtaposition with the planar side wall portions 30 and 39, respectively. Thereafter, the retainer washer 52 is positioned such that its aperture 52' surrounds the threaded portion 50 of the stem 17 and the lock nut 51 is tightened over the stem. Tightening of the lock nut 51 will clampingly capture the components in the noted position whereat the annular shoulder 22 of the flange bears against the undersurface of the locking ring 28 and the undersurface 40 of the retaining plate 38 bears against the upwardly directed surface 28 of the said locking ring.

Importantly, the undermost surfaces 41', 42' of the lands 41, 42 respectively, engage against the flat portions 36, 37 of the elastomeric collar 35 whereby it will be perceived that extrusion of the bladder and/or collar is positively prevented, since all portions of the bore above the bladder are covered or sealed by metallic portions of the ring or plate.

It will be further seen that the beveled portion 35' of the collar which is disposed between the bladder and the inner wall portion of the pressure vessel surrounding the bore isolates the bladder against contact with the pressure vessel in this area rendering the assembly highly resistant to damage at the interface of the bore and vessel.

It will also be observed that the respective O-rings 46 and 49 provide pressure-tight seals with the bore and the outer diameter of the stem 17, respectively.

When it is desired to disassemble a bladder, as after damage thereto, the procedure is merely reversed, i.e. the lock nut 51, washer 52 and retaining plate 38 are removed, the depressurized bladder is shifted, stem first, into the interior of the vessel, the retainer ring is displaced from its braced position surrounding the bore 19, aligned with the axis of the vessel and slipped outwardly, following which the bladder may be readily withdrawn.

It is to be observed that, in advance of attempting to remove the bladder, all pressure must be relieved from the interior of the pressure vessel, for which purposes, as is conventional, the pressure relief valve or the cap member 25 may be secured to the stem, as by a tapered thread, (not shown) which upon unthreading automatically provides a pressure outlet in advance of permitting physical separation of the components.

As will be evident to those skilled in the art and familiarized with the instant disclosure, numerous structural variations may be made without departing from the spirit of the present invention. Accordingly, the same is to be broadly construed within the scope of the appended claims.

Having thus described my invention, what I claim as new and desire to secure by Letters Patent of the United States is:

1. A top repairable accumulator device comprising a pressure vessel having an oil port at one end and being closed at the other end, said closed end having an axially extending bore formed therein, a bladder assembly mounted at said other end, said bladder assembly including an elongate rigid stem having an annular flange portion of a diameter smaller than said bore, said stem including an axially directed gas charging passage, a bladder member including a mounting aperture molded over and bonded to said flange, a separable locking ring mounted on said stem, said ring having a diametric portion of larger diameter than said bore, and a second diametric portion including opposed reduced side edge portions spaced apart a distance less than the diameter of said bore, whereby said ring is endwise insertable into the interior of said vessel through said bore when inclined in the direction of the axis of said vessel, said ring including a central aperture of diameter larger than said stem and smaller than said flange, said stem projecting outwardly through said aperture and through said bore whereby said ring is sandwiched between the walls of said vessel surrounding said bore and said flange, a retaining plate extending downwardly into said bore, said plate including downwardly facing land portions shaped complementally to said reduced side portions, said land portions being disposed in juxtaposition to said side portions, said plate having an outer diameter portion fitting with close tolerance within said bore, and an inner aperture surrounding said stem, a thread portion formed on said stem outside said vessel and a lock nut assembly threadedly mounted on said threaded portion of said stem and including an undersurface reacting against said vessel, said nut assembly clampingly urging said flange outwardly against said ring and said plate inwardly against said ring, thereby removably to secure said bladder assembly within said pressure vessel.

2. Apparatus in accordance with claim 1 wherein said reduced side portions of said ring comprise planar portions extending axially of said vessel, and said lands include opposed surface portions engaging said planar portions.

3. Apparatus in accordance with claim 2 wherein said retainer plate includes a circumferential outer groove formed on said outer diameter and a radially inwardly directed inner groove formed inside said aperture, an inner gasket member disposed in said inner groove in sealing engagement with said stem and an outer gasket in said outer groove in sealing engagement with said bore.

4. Apparatus in accordance with claim 2 wherein said retainer ring includes an annular elastomeric collar member extending radially therebeyond and interposed between portions of said vessel surrounding said bore.

5. Apparatus in accordance with claim 4 wherein said retainer plate includes a circumferential outer groove formed on said outer diameter and a radially inwardly directed inner groove formed inside said aperture, an inner gasket member disposed in said inner groove in sealing engagement with said stem and an outer gasket in said outer groove in sealing engagement with said bore.

6. Apparatus in accordance with claim 1 wherein portions of said ring extend upwardly into said bore, said reduced side portions are disposed within said bore and spaced from the walls defining said bore, and said lands extend into and substantially fill the spaces between said reduced side portions and said walls defining said bore.

7. Apparatus in accordance with claim 6 wherein said reduced side portions of said ring comprise planar portions extending axially of said vessel, and said lands include opposed surface portions engaging said planar portions.

8. Apparatus in accordance with claim 6 wherein said retainer plate includes a circumferential outer groove formed on said outer diameter and a radially inwardly directed inner groove formed inside said aperture, an inner gasket member disposed in said inner groove in sealing engagement with said stem and an outer gasket in said outer groove in sealing engagement with said bore.

9. Apparatus in accordance with claim 6 wherein said retainer ring includes an annular elastomeric collar member extending radially therebeyond and interposed between portions of said vessel surrounding said bore.

* * * * *